United States Patent [19]
Liebig

[11] Patent Number: 6,062,017
[45] Date of Patent: May 16, 2000

[54] STEAM GENERATOR

[75] Inventor: Erhard Liebig, Laufenburg, Germany

[73] Assignee: Asea Brown Boveri AG, Baden, Switzerland

[21] Appl. No.: 09/133,665

[22] Filed: Aug. 12, 1998

[30] Foreign Application Priority Data

Aug. 15, 1997 [EP] European Pat. Off. .............. 97810571

[51] Int. Cl.[7] .................................................... F02G 1/00
[52] U.S. Cl. .......................................... 60/39.182; 60/652
[58] Field of Search ................................ 60/39.182, 652, 60/653, 677, 678, 663

*Primary Examiner*—Noah P. Kamen
*Attorney, Agent, or Firm*—Burns, Doane, Swecker & Mathjis, L.L.P.

[57] ABSTRACT

A steam generator for a combined gas/steam power station plant has a gas-turbine circuit and a steam-turbine circuit, the exhaust gases of a gas turbine (4) giving off their residual heat to a steam turbine via the working medium flowing in a multi-pressure steam generator, each pressure system of the steam generator essentially comprising an economizer (21), an evaporator (22) and a superheater (23). To control the steam temperatures, a steam/steam heat exchanger (58), which can be shut off, is arranged in such a way that heat can be transferred from the hotter vaporous medium to a colder vaporous medium. To this end, the heat exchanger (58) is connected in the region of the respective superheaters (23, 19) between the high-pressure system as hotter heat-exchange area and the low-pressure system as colder heat-exchange area.

6 Claims, 2 Drawing Sheets

STEAM GENERATOR

BACKGROUND OF THE INVENTION

1. Field of the Invention

The invention relates to a steam generator having a plurality of heat-exchange areas for the preheating, evaporation and superheating of the working medium. It relates in particular to the steam-temperature control inside the steam generator.

2. Discussion of Background

Steam generators in the form of heat-recovery boilers for utilizing the waste heat of the gas turbines are as a rule made with a drum-type boiler, with a once-through boiler or with combinations thereof. Compared with conventionally fired boilers, however, the flue-gas temperature in heat-recovery boilers is limited. In particular the evaporation, which takes place at constant temperature, leads to thermodynamic and technical design constraints. In order to achieve as high a flexibility and adaptability to the profile of the flue-gas temperature as possible, the following measures have been proposed hitherto:

An increase in the number of pressure stages; up to 3 pressure stages with reheating are not uncommon.

A complicated division of the heating surfaces in the upper range of the flue-gas temperatures; e.g. alternate arrangement of superheater and reheater heating surfaces.

Branching and merging of feedwater flows or steam flows.

The intention is thus to achieve high live-steam and reheater temperatures. The advantage of a low temperature-difference rating at the pinch point entails considerable complexity as regards heating surfaces.

SUMMARY OF THE INVENTION

Accordingly, one object of the invention is to provide a novel plant of the type mentioned at the beginning, with which a small difference between water temperature and steam temperature on the one hand and flue-gas temperature on the other hand can be realized and which largely has no need of water injection for the steam-temperature control, since this reduces the exergetic and energetic efficiency of the plant.

According to the invention, this is achieved in that a steam/steam heat exchanger, which can be shut off, is arranged between a hotter and a colder heat-exchange area in such a way that heat can be transferred from the hotter vaporous medium to the colder vaporous medium.

With this heat displacement, the flue-gas-side thermal potential in the boiler can be utilized to a maximum extent and more accurate control of the live-steam temperature and, in reheat plants, of the reheating temperature is possible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
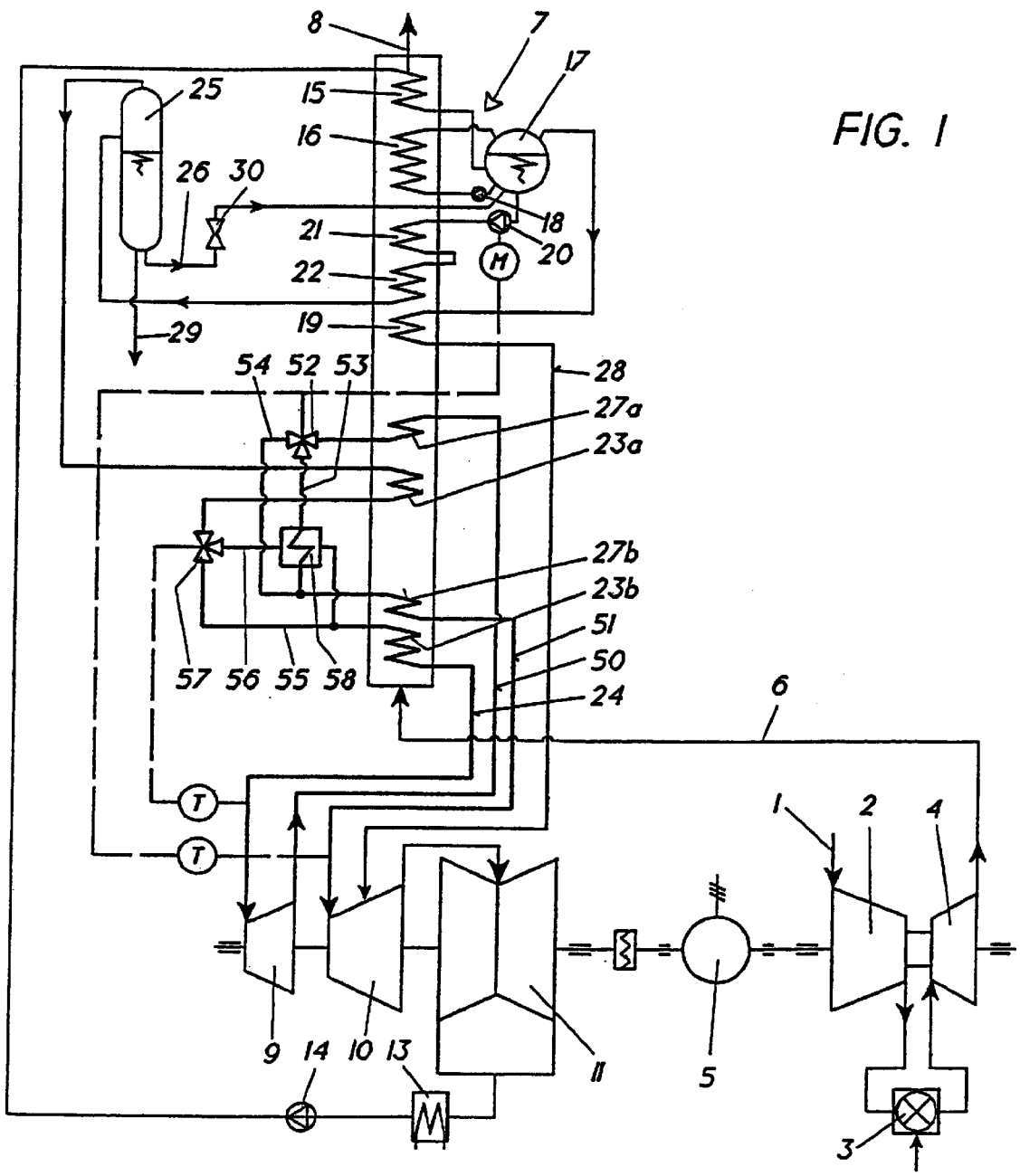
FIG. 1 shows the scheme of a combined gas/steam power station plant.

Referring now to the drawings, wherein like reference numerals designate identical or corresponding parts throughout the several views, only the elements essential for the understanding of the invention are shown, and the direction of flow of the working media is represented by arrows, according to FIG. 1, in the gas-turbine system, fresh air drawn in via a line 1 is compressed in a compressor 2 to the working pressure. The compressed air is heated to a considerable degree in a combustion chamber 3 fired, for example, with natural gas, and the fuel gas which is produced is expanded in a gas turbine 4 to perform work. The energy obtained in the process is delivered to a generator 5 or the compressor 2. The still hot exhaust gas of the gas turbine is fed via a line 6 from the outlet of the gas turbine to a heat-recovery steam generator 7 and, after giving off its heat, is directed from the heat-recovery steam generating plant 7 into the open via a line 8 and a stack (not shown).

In the water/steam circuit, a multi-cylinder steam turbine 9, 10 and 11 is arranged on the same shaft with the gas turbine. The working steam expanded in the low-pressure turbine 11 condenses in a condenser 13. The condensate is delivered directly into the steam generator 7 by means of a condensate pump 14. A remarkable feature is the fact that the plant does not have a feedwater tank/deaerator heated by bleed steam.

The heat-recovery steam generating plant 7 is made as a vertical boiler and in the present case works according to a dual-pressure steam process. A horizontal boiler could of course also be used.

The low-pressure system is made as a circulation system with drum, in which case a forced-circulation system has been selected here. In the flue-gas path of the boiler, it consists of a low-pressure economizer 15, into which the condensate is directed, a low-pressure evaporator 16, and a low-pressure superheater 19. The low-pressure evaporator is connected to a drum 17 via a circulating pump 18. The superheated steam is passed over into a suitable stage of the intermediate-pressure steam turbine 10 via a low-pressure steam line 28.

The high-pressure system is made as a once-through system and can therefore be designed for both subcritical and supercritical parameters. In the flue-gas path of the boiler, it essentially comprises the high-pressure economizer 21, the high-pressure evaporator 22 and the high-pressure superheater 23. The working medium is fed from the low-pressure drum 17 to the high-pressure economizer 21 via a high-pressure feed pump 20. In this way, the previously conventional feedwater tank may be omitted. The superheated steam is passed over into the high-pressure part 9 of the steam turbine via a live-steam line 24.

A separator 25, into which the outlet of the high-pressure evaporator 22 leads, is provided in order to separate the phases. The separator is connected at its top end to the high-pressure superheater 23. It is additionally provided with a blowdown line 29 at its bottom end. Likewise branching off from the bottom end of the separator is a recirculation line 26, which contains a shut-off element 30 and leads into the low-pressure drum 17.

After the partial expansion in the high-pressure part 9 of the turbine, the steam is reheated before being passed over into the intermediate-pressure turbine 10. In the example, this reheating is effected in heat-exchange areas 27 which are arranged in the flue-gas path of the steam generator above the high-pressure superheater 23.

By variation of the pressures and mass flows in the circulation system and in the once-through system, a wide range of combined-cycle processes can be covered by such a steam generator.

The generation of steam starts in the boiler when the respective boiling temperatures are reached. The initial steam in the low-pressure system is generated by expansion of recirculated high-pressure saturation water from the separator. The separator ensures that the high-pressure superheater remains dry at all times and steam superheated at an early stage is available at the boiler outlet. As soon as the pressure necessary for stable operation has been reached in the high-pressure evaporator, the live steam can be used for starting the steam turbine in variable-pressure operation.

According to the invention, a heat displacement on the steam side is now to be carried out in order to control the steam temperatures. To this end, a steam/steam heat exchanger 58 is provided and is arranged between a hotter and a colder heat-exchange area in such a way that heat can be transferred from the hotter vaporous medium to the colder vaporous medium.

In the example, the hotter heat-exchange area is formed by the high-pressure superheater 23 and the colder heat-exchange area is formed by the reheater 27. To put this into effect, the superheater 23 and the reheater 27 are divided into sectional areas 23a, 23b and 27a, 27b respectively. The sectional areas 23a and 23b of the superheater 23 are connected to one another via a connecting line 55 leading out of the flue of the steam generator, while the sectional areas 27a and 27b of the reheater 27 are connected to one another via a connecting line 54 leading out of the flue of the steam generator.

Via a superheater valve 57, a first heating line in the form of the superheater heating line 56 branches off from the connecting line 55 and leads into the steam/steam heat exchanger 58. From the outlet of this heat exchanger, this superheater heating line is directed into the connecting line 55 again.

Via a reheater valve 52, a second heating line in the form of the reheater heating line 53 branches off from the connecting line 54 and leads into the steam/steam heat exchanger 58. From the outlet of this heat exchanger, this reheater heating line is directed into the connecting line 54 again.

Temperature measurements are provided in the live-steam line 24 and in the hot reheater line 51. These temperature measurements as well as the respective position of the superheater valve 57 and the reheater valve 52 are linked via a logic circuit in order to prevent flow through the steam/steam heat exchanger 58 on one side.

The mode of operation of the invention is as follows:

The efficiency of a water/steam circuit crucially depends on the live-steam temperature, so that the control of the latter takes first priority. If the live-steam temperature does not reach the specified desired value, the superheater line 56 is in any case closed. If the live-steam temperature corresponds to or exceeds the predetermined desired value, the superheater valve 57 opens, flow occurs through the superheater heating line 56, and, when flow likewise occurs through reheater heating line 53, heat is transferred to the reheater system via the exchanger 58.

In this operating mode, the reheater steam flows through the exchanger 58 and gets heat there from the superheater steam until the predetermined desired value of the reheating temperature is reached. If the reheating temperature corresponds to (or exceeds) the desired value, the two heating lines 53 and 56 are shut off, and flow does not occur through the exchanger 58.

If the reheating temperature exceeds the desired value, the feedwater quantity or steam quantity is increased via the feed pump 20. To this end, the feed-pump control is also included in the abovementioned logic circuit.

From all that, it can be seen that flow does not occur through the steam/steam heat exchanger 58 if the system is compensated. If the system is uncompensated, however, both the live-steam temperature and the reheating-steam temperature can be held with high accuracy with the novel measure, in which case the inefficient means of water injection can be largely or even completely dispensed with.

Figure 2:
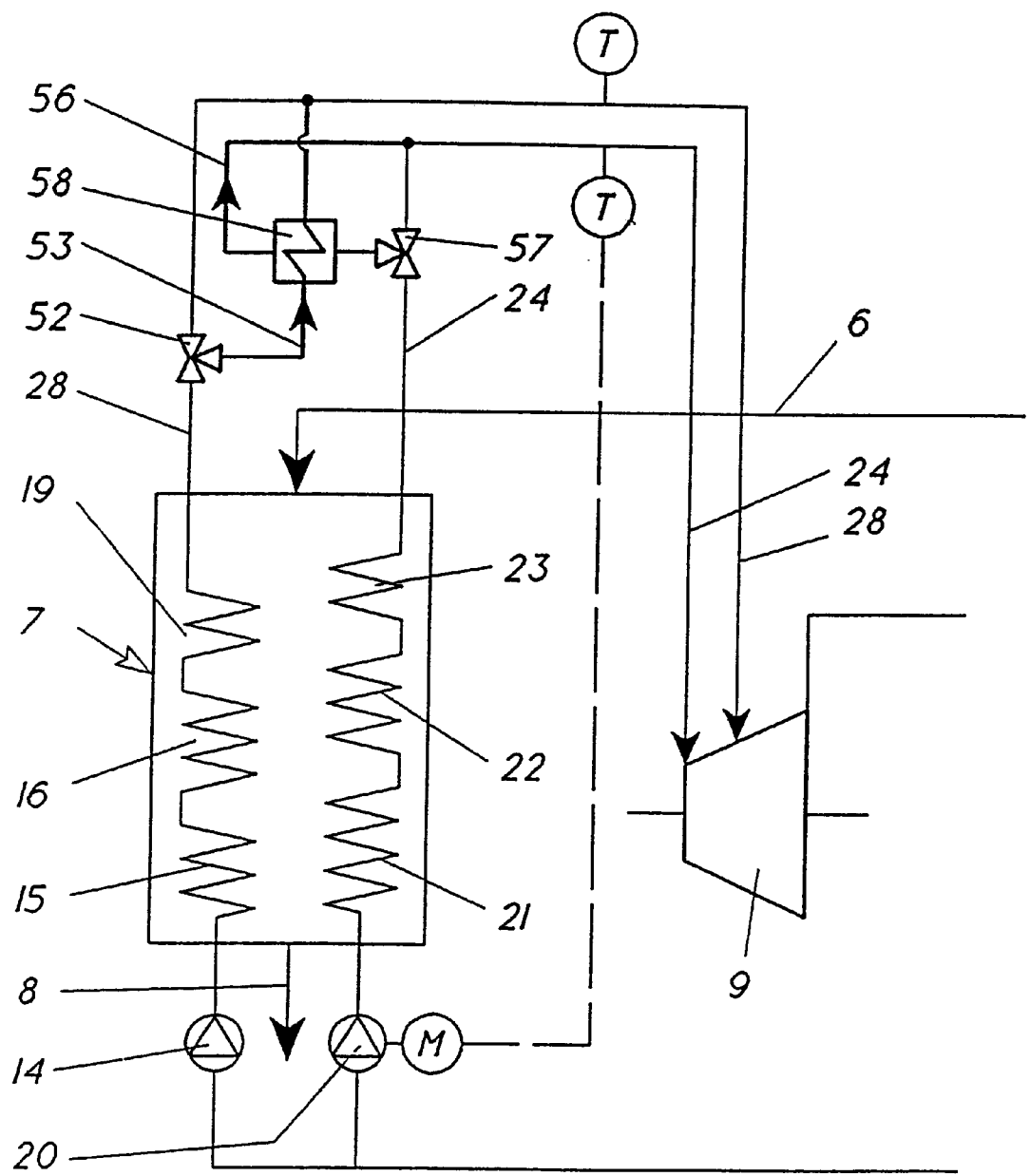
FIG. 2 shows the scheme of a dual-pressure steam generator.

The use of the invention in a simple dual-pressure boiler without reheating is shown in FIG. 2. Elements having the same function are provided with the same reference numerals as in FIG. 1.

The heat-recovery steam-generating plant 7 there is made as a vertical boiler and in the present case likewise works according to a dual-pressure steam process. A horizontal boiler could of course also be used. Likewise, the number of pressure stages in the example is unimportant.

The low-pressure system is made as a once-through system. In the flue-gas path of the boiler, it consists of a low-pressure economizer 15, into which the condensate is directed via a feed pump 14, a low-pressure evaporator 16, and a low-pressure superheater 19. The superheated steam is passed over into a suitable stage of the steam turbine via a low-pressure steam line 28.

The high-pressure system is made as a once-through system and can therefore be designed for both subcritical and supercritical parameters. In the flue-gas path of the boiler, it essentially comprises the high-pressure economizer 21, the high-pressure evaporator 22 and the high-pressure superheater 23. The working medium is fed to the high-pressure economizer 21 via a high-pressure feed pump 20. The superheated steam is passed over into the high-pressure part 9 of the steam turbine via a live-steam line 24.

To separate the phases, one separator each (not shown) can be provided in both systems, which separators are then connected on the inlet side to the outlet of the evaporators 16, 22 and on the outlet side to the inlet of the superheaters 19, 23.

In this example, the hotter heat-exchange area is formed by the high-pressure superheater 23 and the colder heat-exchange area is formed by the low-pressure superheater 19. Here, in contrast to the example described above, the heat-exchange areas concerned, on the one hand the high-pressure superheater 23 and on the other hand the low-pressure superheater 19, are not divided into sectional areas. The lines leading to the apparatus 58 branch off here downstream of the two superheaters from the respective lines 24 and 28 leading to the turbine 9.

Via a high-pressure superheater valve 57, a first heating line in the form of the high-pressure superheater heating line 56 branches off from the live-steam line 24 and leads into the steam/steam heat exchanger 58. From the outlet of this heat exchanger, this high-pressure superheater heating line is directed into the live-steam line 24 again.

Via a low-pressure superheater valve 52, a second heating line in the form of the low-pressure superheater heating line 53 branches off from the low-pressure steam line 28 and leads into the steam/steam heat exchanger 58. From the outlet of this heat exchanger, this low-pressure superheater heating line is directed into the low-pressure steam line 28 again.

The control is effected as in the above exemplary embodiment, the superheated low-pressure steam being heated here.

The invention is of course not restricted to the plants having dual-pressure systems shown and described. Its use does not depend on the type and the construction of the heat-recovery boiler and the steam-turbine plant, on the condensation system, on the presence of reheating, on the gas-turbine plant or on the starting process selected. In contrast with the arrangement shown and described, a horizontal boiler can be used. In combined-cycle power stations with triple-pressure systems without reheating, the steam/steam heat exchanger will advantageously be arranged between the high-pressure system and the intermediate-pressure system; in such systems with reheating, the apparatus is connected between the high-pressure system and the reheating system. In conventional steam generators, too, the novel steam/steam heat exchanger can be arranged between the live-steam system and the reheating system.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A steam generator for a combined gas/steam power station plant comprising: a plurality of heat-exchange areas for the preheating, evaporation and superheating of a flow of working medium, a steam/steam heat exchanger capable of being shut off from the flow of working medium including a hotter vaporous working medium and a colder vaporous working medium, the steam/steam heat exchanger being arranged between a hotter heat-exchange area and a colder heat-exchange area such that heat can be transferred from the hotter vaporous working medium to the colder vaporous working medium when the hotter vaporous working medium and the colder vaporous working medium are directed to flow through the steam/steam heat exchanger.

2. The steam generator as claimed in claim 1, wherein the hotter vaporous working medium and the colder vaporous working medium are capable of being directed to flow to the steam/steam heat exchanger through a first heating line and a second heating line, the first heating line branching off from a first flow path including the hotter vaporous working medium flowing from the hotter heat-exchange area and connects to the steam/steam heat exchanger, from the steam/steam heat exchanger the first heating line then connects back into the first flow path downstream of the hotter heat-exchange area, the second heating line branching off from a second flow path including the colder vaporous working medium flowing from the colder heat-exchange area and is admitted to the steam/steam heat exchanger, from the steam/steam heat exchanger the second heating line then connects back into the second flow path downstream of the colder heat-exchange area.

3. The steam generator as claimed in claim 1, including a gas-turbine circuit and a steam-turbine circuit, exhaust gases of a gas turbine of the gas turbine circuit giving off a residual heat to at least one steam turbine of the steam-turbine circuit via the flow of working medium flowing through a plurality of pressure systems of the steam generator, each pressure system of the steam generator including an economizer, an evaporator and a superheater, the steam/steam heat exchanger arranged such that heat can be transferred between a high-pressure system of the steam generator including the hotter heat-exchange area and the low-pressure system of the steam generator including the colder heat-exchange area.

4. The steam generator as claimed in claim 1, including a gas-turbine circuit and a steam-turbine circuit, exhaust gases of a gas turbine of the gas turbine circuit giving off a residual heat to at least one steam turbine of the steam-turbine circuit via the flow of working medium flowing through the steam generator, the steam generator including an economizer, an evaporator, a superheater and a reheater, the steam/steam heat exchanger being arranged such that a heat exchange occurs between the superheater as the hotter heat-exchange area and the reheater as the colder heat-exchange area.

5. The steam generator as claimed in claim 4, wherein the superheater and the reheater are each divided into a plurality of sectional areas, the plurality of sectional areas of the superheater each forming a hotter heat-exchange area and the plurality of sectional areas of the reheater each forming a colder heat-exchange area, the hotter vaporous working medium and the colder vaporous working medium are capable of being directed to flow to the steam/steam heat exchanger through a first heating line and a second heating line, the first heating line branching off from a first flow path including the hotter vaporous working medium flowing from a hotter heat-exchange area and connects to the steam/steam heat exchanger, from the steam/steam heat exchanger the first heating line then connects back into the first flow path downstream of the hotter heat-exchange area and then connects to another hotter heat exchange area, the second heating line branching off from a second flow path including the colder vaporous working medium flowing from the colder heat-exchange area and is admitted to the steam/steam heat exchanger, from the steam/steam heat exchanger the second heating line then connects back into the second flow path downstream of the colder heat-exchange area and then connects to another colder heat exchange area.

6. A method of operating a steam generator for a combined gas/steam power station plant including a plurality of heat-exchange areas for the preheating, evaporation and superheating of a flow of working medium, a steam/steam heat exchanger capable of being shut off from the flow of working medium including a hotter vaporous working medium and a colder vaporous working medium, the steam/steam heat exchanger being arranged between a hotter heat-exchange area and a colder heat-exchange area such that heat can be transferred from the hotter vaporous working medium to the colder vaporous working medium when the hotter vaporous working medium and the colder vaporous working medium are directed to flow through the steam/steam heat exchanger, the hotter vaporous working medium and the colder vaporous working medium are capable of being directed to flow to the steam/steam heat exchanger through a first heating line and a second heating line, the first heating line branching off from a first flow path including the hotter vaporous working medium flowing from the hotter heat-exchange area and connects to the steam/steam heat exchanger, from the steam/steam heat exchanger the first heating line then connects back into the first flow path downstream of the hotter heat-exchange area, the second heating line branching off from a second flow path including the colder vaporous working medium flowing from the colder heat-exchange area and is admitted to the steam/steam heat exchanger, from the steam/steam heat exchanger the second heating line then connects back into the second flow path downstream of the colder heat-exchange area comprising the steps of:

measuring a temperature of the hotter vaporous working medium at a point after the first heating line connects back into the first flow path;

measuring a temperature of the colder vaporous working medium at a point after the second heating line connects back into the second flow path;

comparing the measured temperature of the hotter vaporous working medium and the measured temperature of the colder vaporous working fluid to a predetermined desired value; and performing at least one of the steps of shutting off the flow of hotter vaporous working medium through the first heating line if the measured temperature of the hotter vaporous working medium is below the predetermined desired value, directing the flow of hotter vaporous working medium through the first heating line if the measured temperature of the hotter vaporous working medium corresponds to or exceeds the predetermined desired value such that when the colder vaporous working medium flows through the second heating line, heat is transferred to the colder vaporous working medium via the steam/steam heat exchanger, shutting off the flow of hotter vaporous working medium through the first heating line and the flow of colder vaporous working medium through the second heating line when the measured temperature of the colder vaporous working medium corresponds to the predetermined desired value, increasing the flow of the hotter vaporous working medium through the first flow path via a feed pump located in the first flow path when the measured temperature of the colder vaporous working medium exceeds the predetermined desired value.

* * * * *